United States Patent
Kono et al.

(10) Patent No.: US 11,461,006 B2
(45) Date of Patent: Oct. 4, 2022

(54) COMMUNICATION DEVICE HAVING WIRELESS COMMUNICATION INTERFACE, MEMORY AND PROCESSOR WRITING RECEIVED SETTING INFORMATION INTO THE MEMORY

(71) Applicant: KABUSHIKI KAISHA TOKAI RIKA DENKI SEISAKUSHO, Aichi (JP)

(72) Inventors: Yuki Kono, Aichi (JP); Shigenori Nitta, Aichi (JP); Masateru Furuta, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 108 days.

(21) Appl. No.: 17/065,070

(22) Filed: Oct. 7, 2020

(65) Prior Publication Data
US 2021/0149584 A1 May 20, 2021

(30) Foreign Application Priority Data
Nov. 20, 2019 (JP) .............................. JP2019-209283

(51) Int. Cl.
*G06F 3/06* (2006.01)
*H04B 1/3822* (2015.01)
(Continued)

(52) U.S. Cl.
CPC ......... *G06F 3/0604* (2013.01); *H04B 1/3822* (2013.01); *G06F 3/0655* (2013.01); *H04W 80/02* (2013.01); *H04W 88/02* (2013.01)

(58) Field of Classification Search
CPC ....... H04W 4/80; H04W 84/12; H04W 88/06; H04W 12/06; H04W 76/10; H04W 12/08;
(Continued)

(56) References Cited

U.S. PATENT DOCUMENTS

| 2009/0150584 A1* | 6/2009 | Tan ....................... G06F 13/385 |
| | | 713/340 |
| 2015/0264732 A1* | 9/2015 | Satoh .................... H04W 12/04 |
| | | 455/41.1 |

FOREIGN PATENT DOCUMENTS

JP          2003-056398 A       2/2003

* cited by examiner

*Primary Examiner* — Golam Sorowar
(74) *Attorney, Agent, or Firm* — Greenblum & Bernstein, P.L.C.

(57) ABSTRACT

A communication device includes a wireless communication interface, a memory configured to store information, and a processor configured to write the setting information received by the wireless communication interface into the memory. The setting information is information regarding a setting necessary for the wireless communication interface to perform the wireless communication. The wireless communication interface includes a first wireless communication interface configured to perform communication in conformity with a first wireless communication standard and a second wireless communication interface configured to perform communication in conformity with a second wireless communication standard. The processor includes first and second processors, and the memory includes first and second memories. The second wireless communication interface starts wireless communication with another device and after starting the wireless communication with the other device, the second wireless communication interface writes the setting information into the second memory.

6 Claims, 2 Drawing Sheets

(51) Int. Cl.
*H04W 88/02* (2009.01)
*H04W 80/02* (2009.01)

(58) Field of Classification Search
CPC ............... H04W 88/02; H04W 12/088; H04W
36/0016; H04W 40/244; H04W 76/14;
H04W 4/023; H04W 76/19; H04W 76/25;
H04W 76/38; H04W 8/20; H04W 84/18;
H04W 4/40; H04W 4/00; H04W 4/06;
H04W 76/40; H04W 36/36; H04W 48/16;
H04W 52/0235; H04W 8/005; H04W
8/22; H04W 80/00; H04W 12/068; H04W
12/61; H04W 12/63; H04W 28/18; H04W
36/14; H04W 52/245; H04W 12/03;
H04W 12/106; H04L 61/6081; H04L
63/105; H04L 67/306; H04L 12/18; H04L
12/1845; H04L 63/20; H04L 63/061;
H04L 63/08; H04L 63/0853; H04L
63/107; H04L 67/42; H04L 12/10; H04L
12/12; H04L 29/06; H04L 29/12839;
H04L 41/0813
See application file for complete search history.

COMMUNICATION DEVICE HAVING WIRELESS COMMUNICATION INTERFACE, MEMORY AND PROCESSOR WRITING RECEIVED SETTING INFORMATION INTO THE MEMORY

CROSS REFERENCE TO RELATED APPLICATION(S)

This application is based upon and claims benefit of priority from Japanese Patent Application No. 2019-209283, filed on Nov. 20, 2019, the entire contents of which are incorporated herein by reference.

BACKGROUND

The present invention relates to a communication device and a method of producing the communication device.

In recent years, it has been common for one of devices to store information in another one of the devices and read out the information stored in the other one of the devices. For example, JP 2003-56398A discloses a technology that allows an ECU, which is not a replacement target, to read out vehicle information stored in a replacement target ECU via an in-vehicle communication line, store the vehicle information, and write the vehicle information into the replaced ECU when replacing the ECU having the vehicle information stored therein.

However, according to the technology described in JP 2003-56398A, the information is read and written through wired communication. Therefore, this requires additional work specific to the wired communication. For example, it is necessary to connect the devices via a wire.

Accordingly, the present invention is made in view of the aforementioned issues, and an object of the present invention is to provide a mechanism that makes it possible to omit work to control storage of information through communication between devices.

To solve the above described problem, according to an aspect of the present invention, there is provided a communication device comprising: a wireless communication section configured to perform wireless communication; a storage section configured to store information; and a control section configured to write the information received by the wireless communication section into the storage section.

To solve the above described problem, according to another aspect of the present invention, there is provided a communication device comprising: a wireless communication section configured to perform wireless communication; and a control section configured to transmit information to another communication device through wireless communication performed by the wireless communication section and stores the transmitted information in the other communication device.

To solve the above described problem, according to another aspect of the present invention, there is provided a method of producing a communication device, the method comprising transmitting information to the communication device and storing the information in the communication device through wireless communication.

SUMMARY

As described above, according to the present invention, it is possible to provide the mechanism that makes it possible to omit work to control storage of information through communication between devices.

DETAILED DESCRIPTION OF THE EMBODIMENT(S)

Figure 1:
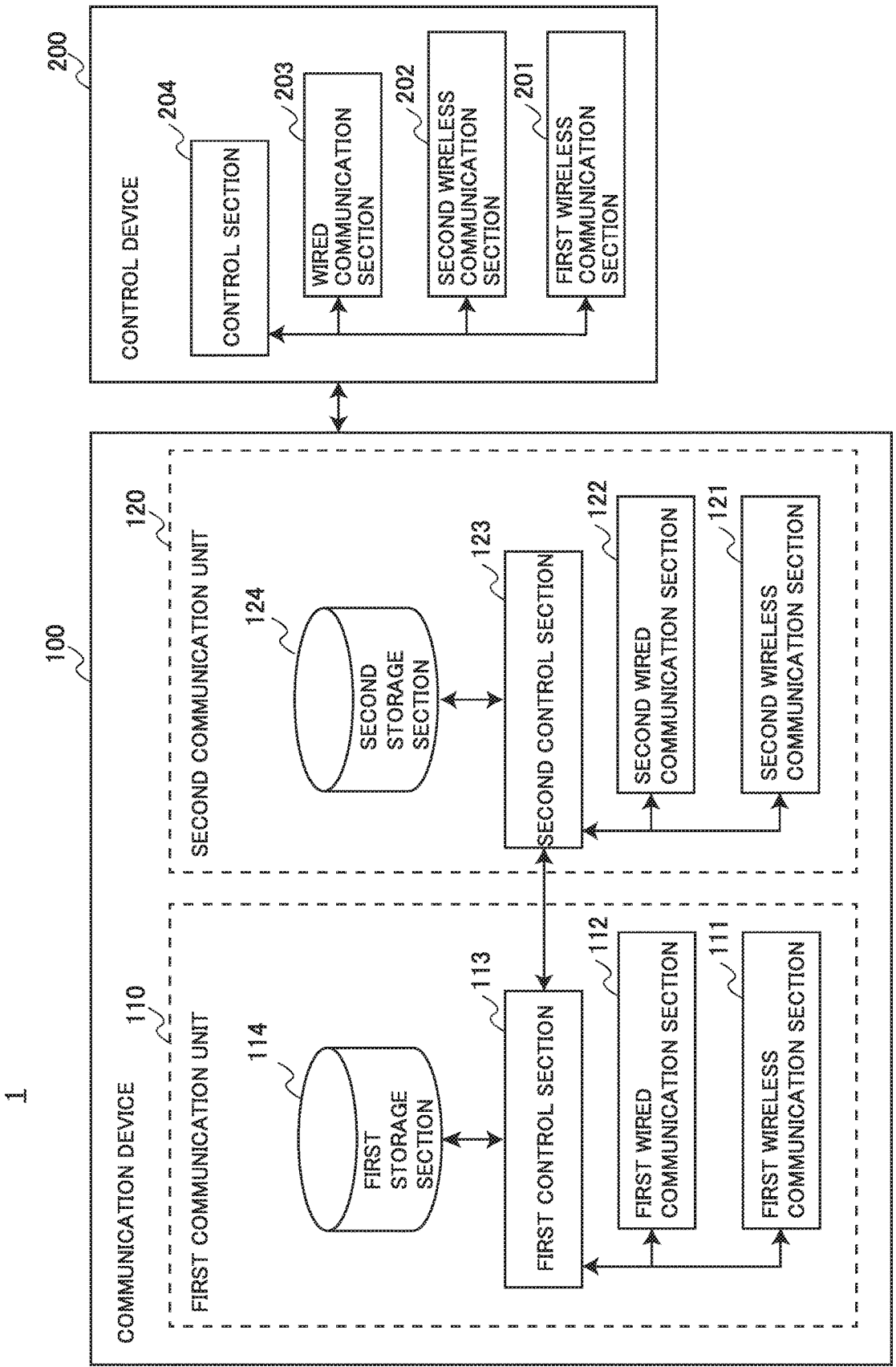
FIG. 1 is a block diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a block diagram illustrating an example of a configuration of a system 1 according to an embodiment of the present invention. As illustrated in FIG. 1, the system 1 according to the present embodiment includes a communication device 100 and a control device 200.

(1) Communication Device 100

The communication device 100 is a device that makes it possible to communicate with another device in a wired/wireless manner. The communication device 100 includes a first communication unit 110 and a second communication unit 120, which are structural elements for performing communication in conformity with different wireless communication standards.

First Communication Unit 110

As illustrated in FIG. 1, the first communication unit 110 includes a first wireless communication section 111, a first wired communication section 112, a first control section 113, and a first storage section 114.

The first wireless communication section 111 has a function of performing wireless communication in conformity with a first wireless communication standard. The first wireless communication section 111 is configured as a communication interface that makes it possible to perform wireless communication in conformity with the first wireless communication standard.

The first wired communication section 112 has a function of performing wired communication in conformity with a predetermined wired communication standard. The first wired communication section 112 includes a terminal, and transmits/receives information to/from another device connected in a wired manner via the terminal. Hereinafter, the terminal is also referred to as a test pin (TP).

The first storage section 114 has a function of storing various kinds of information for operating the first communication unit 110. For example, the first storage section 114 stores setting information that is information regarding a setting necessary for the first wireless communication section 111 to perform the wireless communication. For example, the first storage section 114 includes a storage medium such as flash memory, and a processing device that performs recording/playback on/of the storage medium.

The first control section 113 has a function of controlling operation of the first communication unit 110. As an example, the first control section 113 controls the first wireless communication section 111 and the first wired communication section 112, communicates with another device, reads out information from the first storage section 114, and writes information into the first storage section 114. Note that, the first control section 113 is capable of exchanging information with a second control section 123, and controlling a second wireless communication section 121, a second wired communication section 122, and a second storage section 124 via the second control section 123. For example, the first control section 113 is configured as any circuit such as a central processing unit (CPU), a microprocessing unit (MPU), or an electronic control unit (ECU).

Second Communication Unit 120

As illustrated in FIG. 1, the second communication unit 120 includes the second wireless communication section 121, the second wired communication section 122, the second control section 123, and the second storage section 124.

The second wireless communication section 121 has a function of performing wireless communication in conformity with a second wireless communication standard. The second wireless communication section 121 is configured as a communication interface that makes it possible to perform wireless communication in conformity with the second wireless communication standard.

The second wired communication section 122 has a function of performing wired communication in conformity with a predetermined wired communication standard. The second wired communication section 122 include a TP, and transmits/receives information to/from another device connected in a wired manner via the TP.

The second storage section 124 has a function of storing various kinds of information for operating the second communication unit 120. For example, the second storage section 124 stores setting information that is information regarding a setting necessary for the second wireless communication section 121 to perform the wireless communication. For example, the second storage section 124 includes a storage medium such as flash memory, and a processing device that performs recording/playback on/of the storage medium.

The second control section 123 has a function of controlling operation of the second communication unit 120. As an example, the second control section 123 controls the second wireless communication section 121 and the second wired communication section 122, communicates with another device, reads out information from the second storage section 124, and writes information into the second storage section 124. Note that, the second control section 123 is capable of exchanging information with the first control section 113, and controlling the first wireless communication section 111, the first wired communication section 112, and the first storage section 114 via the first control section 113. For example, the second control section 123 is configured as any circuit such as a CPU, an MPU, or an ECU.

(2) Control Device 200

The control device 200 is a device that controls reading and writing of information by the communication device 100. As illustrated in FIG. 1, the control device 200 includes a first wireless communication section 201, a second wireless communication section 202, a wired communication section 203, and a control section 204.

The first wireless communication section 201 has a function of performing wireless communication in conformity with the first wireless communication standard. The first wireless communication section 201 is configured as a communication interface that makes it possible to perform the wireless communication in conformity with the first wireless communication standard.

The second wireless communication section 202 has a function of performing wireless communication in conformity with the second wireless communication standard. The second wireless communication section 202 is configured as a communication interface that makes it possible to perform the wireless communication in conformity with the second wireless communication standard.

The wired communication section 203 has a function of performing wired communication in conformity with a predetermined wired communication standard. The wired communication section 203 include a terminal that is capable of wired connection with the TP, and transmits/receives information to/from another device including the TP.

The control section 204 has a function of controlling operation of the control device 200. As an example, the control section 204 controls the first wireless communication section 201, the second wireless communication section 202, and the wired communication section 203, communicates with another device, writes information into a storage section of the other device, and reads out information from the storage section of the other device. For example, the control section 204 is configured as any circuit such as a CPU, an MPU, or an ECU.

(3) Wireless Communication Standards

Any wireless communication standards are applicable to the first wireless communication standard and the second wireless communication standard. However, the second wireless communication standard satisfies a requirement that the second communication standard is capable of communication at a higher speed than the first wireless communication standard. As a specific example that satisfies this requirement, the second wireless communication standard may use a carrier wave of higher frequency than frequency of a carrier wave used under the first wireless communication standard. As frequency gets higher, an amount of information that can be carried per unit time increases and communication speed gets higher. As frequency gets lower, an amount of information that can be carried per unit time decreases and communication speed gets slower. In such a way, the above-described requirement is satisfied. In another specific example that satisfies the requirement, the second wireless communication standard uses multiple-input and multiple-output (MIMO), and the first wireless communication standard does not have to use MIMO. It is known that, in the case of using MIMO, throughput is improved in comparison with the case where MIMO is not used. As a similar specific example, the second wireless communication standard uses channel bonding and the first wireless communication standard does not have to use channel bonding.

For example, the first wireless communication standard may use ultra high frequency (UHF) and low frequency (LF). The UHF and LF are used for communication between a mobile device and a vehicle in a smart entry system, for example. In a typical smart entry system, the UHF is used for transmission from the mobile device to the vehicle, and the LF is used for transmission from the vehicle to the mobile device.

For example, the second wireless communication standard may use ultra-wideband (UWB). The UWB has a property that makes it possible to perform ranging with high accuracy. In particular, when using impulse UWB, it is possible to measure air propagation time of a radio wave with high accuracy by using the radio wave of ultra-short pulse width in a nanosecond order or shorter, and it is possible to perform positioning and ranging on the basis of the propagation time with high accuracy.

(4) Hardware Configuration As an example, the first communication unit 110 is configured as a chipset having an LF/UHF communication function and a wired communication function. As an example, the second communication unit 120 is configured as a chipset having a UWB communication function. In addition, a substrate on which these chipsets are built are stored in a casing or the like, and thereby the communication device 100 is configured as a finished product. The state where the chipsets are built on the substrate is also referred to as a substrate state, and the finished product state is also referred to as an ASSY (assembly) state.

The communication device 100 is installed in the mobile device in the smart entry system, for example. Therefore, for example, the communication device 100 stores authentication information such as an identifier (ID), a password, and the like for authentication of the vehicle, and communicates with the vehicle. The communication device 100 configured as the mobile device communicates with the vehicle. This makes it possible to cancel usage restriction of the vehicle by unlocking a door lock of the vehicle and starting an engine. Of course, the communication device 100 may be installed in the vehicle in the smart entry system, communicate with the mobile device, and cancel the usage restriction of the vehicle.

2. Technical Problem

In the communication device described above with reference to FIG. 1, a writing signal (hereinafter, also referred to as probe) is input to the TP to write various kinds of setting values regarding wireless communication such as an electric field intensity setting during production at a factory.

Conventionally, the various kinds of setting values regarding the wireless communication have been written in the substrate state where the TP is exposed. Therefore, it has been difficult to adjust an optimal radio property in the ASSY state.

In addition, after the setting values have been written via the TP at the factory, access to the TP has been locked. The phrase "access to the TP has been locked" means that reading and writing of information via the TP have been restricted (in other words, reading and writing of information via the TP have been prohibited). The access to the TP has been locked to prevent reading/writing of invalid information after shipping of the products and ensure their security. On the other hand, this has caused inconvenience because it has been impossible to read/write information after shipping of the products even in the case where there has been a valid reason such as maintenance.

As described above, the conventional technology has required work to control information storage in the communication device, which is specific to the wired communication. Accordingly, in the present embodiment, wireless communication is used for controlling information storage in the communication device 100. This makes it possible to omit the work specific to the wired communication and omit the work to control storage.

3. Technical Features (1) Information Storage Control Through Wired Communication The communication device 100 reads and writes information under the control of the control device 200 through wired communication.

Specifically, the control section 204 transmits a write request including write target information to the communication device 100 through wired communication performed by the wired communication section 203, and causes the communication device 100 to store the transmitted write target information. The write request is information for requesting to write the write target information into the storage section. In the case where the write request is received by the first wired communication section 112, the first control section 113 writes the received write target information into the storage section 114, and the first wired communication section 112 transmits a writing result to the control device 200. Note that, the writing result includes information indicating success or failure of the writing, or the like. In the case where the write request is received by the second wired communication section 122, the second control section 123 writes the received write target information into the second storage section 124, and the second wired communication section 122 transmits a writing result to the control device 200.

In addition, the control section 204 transmits a read request that designates read target information to the communication device 100 through wired communication performed by the wired communication section 203, and causes the communication device 100 to read out designated information and make a reply. In the case where the read request is received by the first wired communication section 112, the first control section 113 reads out the read target information from the first storage section 114, and the first wired communication section 112 transmits read-out information to the control device 200. In the case where the read request is received by the second wired communication section 122, the second control section 123 reads out the read target information from the second storage section 124, and the second wired communication section 122 transmits the read-out information to the control device 200.

The communication device 100 locks access to the TP under the control of the control device 200. Specifically, the control section 204 transmits an access lock request to the communication device 100 through wired communication performed by the wired communication section 203, and causes the communication device 100 to lock access to the TP. In the case where the access lock request is received by the first wired communication section 112, the first control section 113 restricts writing of information received by the first wired communication section 112 into the first storage section 114 and restricts reading of information stored in the first storage section 114. Note that, the writing restriction and reading restriction described herein mean to prohibit writing or reading. In the case where the access lock request is received by the second wired communication section 122, the second control section 123 restricts writing of information received by the second wired communication section 122 into the second storage section 124 and restricts reading of information stored in the second storage section 124. Such configurations make it possible to prevent reading/writing of invalid information after shipping of the products and ensure their security.

Examples of the information to be read/written include setting information that is information regarding settings necessary for the first wireless communication section 111 and the second wireless communication section 121 to perform wireless communication. Here, for example, the setting information includes information regarding transmission/reception of a wireless signal such as electric field intensity, frequency of a carrier wave, a modulation method, and a coding method, authentication information such as an ID and a password, and the like. Note that, the setting information that is information regarding a setting necessary for the first wireless communication section 111 to perform wireless communication is received by the first wired communication section 112 and is written into the first storage section 114. In a similar way, the setting information that is information regarding a setting necessary for the second wireless communication section 121 to perform wireless communication is received by the second wired communication section 122 and is written into the second storage section 124. Such configurations make it possible to individually store the two pieces of setting information regarding different wireless communication standards.

As described above, the communication device 100 is capable of reading/writing information via the TP and locking access to the TP.

(2) Information Storage Control Through Wireless Communication

The communication device 100 reads and writes information under the control of the control device 200 through wireless communication.

Specifically, the control section 204 transmits a write request including write target information to the communication device 100 through wireless communication performed by the first wireless communication section 201 and the second wireless communication section 202, and causes the communication device 100 to store the transmitted write target information. The communication device 100 writes information into the storage section (first storage section 114 and second storage section 124) on the basis of the write request received from the control device 200. Specifically, in the case where the write request is received by the first wireless communication section 111, the first control section 113 writes the received write target information into the first storage section 114, and the first wireless communication section 111 transmits a writing result to the control device 200. In the case where the write request is received by the second wireless communication section 121, the second control section 123 writes the received write target information into the second storage section 124, and the second wireless communication section 121 transmits a writing result to the control device 200. Note that, the write request and the writing result are transmitted and received while being stored in a payload part of a UWB signal or an LF/UHF signal. Such configurations make it possible to individually store pieces of information received through communication in conformity with two different wireless communication standards.

In addition, the control section 204 transmits a read request that designates read target information to the communication device 100 through wireless communication performed by the first wireless communication section 201 and the second wireless communication section 202, and causes the communication device 100 to read out designated information and make a reply. The communication device 100 reads out information stored in the storage section (first storage section 114 and second storage section 124) on the basis of the read request received from the control device 200, and transmits the information to the control device 200. Specifically, in the case where the read request is received by the first wireless communication section 111, the first control section 113 reads out the read target information from the first storage section 114, and the first wireless communication section 111 transmits the read-out information to the control device 200. In the case where the read request is received by the second wireless communication section 121, the second control section 123 reads out the read target information from the second storage section 124, and the second wireless communication section 121 transmits the read-out information to the control device 200. Note that, the read request and the read-out information are transmitted and received while being stored in a payload part of a UWB signal or an LF/UHF signal. Such configurations make it possible to individually and wirelessly read out the pieces of information stored in the two storage sections.

As described above, the communication device 100 is capable of reading/writing information through the wireless communication. Even in the ASSY state where the access to the TP is locked, it is possible to read/write information. This makes it possible to release the conventional constraint that information should be read and written in the substrate state where the TP is exposed, and this makes it possible to improve convenience. In addition, it is possible to read/write information through the wireless communication in parallel to another process such as an assembly process, for example. Therefore, it is possible to shorten takt time as a rate of information to be read/written through the wireless communication is increased and a rate of information to be read/written through the wired communication is decreased. All the information to be read/written may be communicated through the wireless communication. In this case, it is not necessary to physically connect the communication device 100 to the control device 200. This makes it possible to reduce workload and further shorten the takt time.

Examples of the information to be read/written include setting information that is information regarding settings necessary for the first wireless communication section 111 and the second wireless communication section 121 to perform the wireless communication. Here, for example, the setting information includes information regarding transmission/reception of a wireless signal such as electric field intensity, frequency of a carrier wave, a modulation method, and a coding method, authentication information such as an ID and a password, and the like. In other words, according to the present embodiment, it is possible to adjust the optimal radio property in the ASSY state. In addition, it is also possible to check the setting information and use a DIAG function at a time of maintenance after shipping of products. Note that, the DIAG function is a function of diagnosing presence/absence of malfunction on the basis of whether or not predetermined information is stored, the predetermined information existing in the case where malfunction is found. Note that, the setting information that is information regarding a setting necessary for the first wireless communication section 111 to perform the wireless communication is typically received by the first wireless communication section 111 and is written into the first storage section 114. In a similar way, the setting information that is information regarding a setting necessary for the second wireless communication section 121 to perform the wireless communication is typically received by the second wireless communication section 121 and is written into the second storage section 124. Such configurations make it possible to individually store the pieces of setting information regarding two different wireless communication standards.

It is also possible to use wireless communication to read/write information other than the setting information that is information regarding the setting necessary to perform the wireless communication. For example, it is also possible to read/write information indicating whether or not a supply is necessary, information indicating an amount of necessary supplies, and other information. This makes it possible to improve convenience at the time of maintenance.

The second control section 123 may control a process of writing information into the first storage section 114 and a process of reading out information from the first storage section 114. Specifically, in the case where a request of writing information into the first storage section 114 is received by the second wireless communication section 121, the second control section 123 controls a process of writing received write target information into the first storage section 114. Next, the second control section 123 transmits a writing result to the control device 200 via the second wireless communication section 121. In addition, in the case where a request of reading information from the first storage section 114 is received by the second wireless communication section 121, the second control section 123 controls a process of reading out read target information from the first storage section 114. Next, the second control section 123 transmits the read-out information to the control device 200 via the second wireless communication section 121. This makes it possible to read/write information from/into the first storage section 114 in conformity with the second wireless communication standard that is capable of faster communication than the first wireless communication standard. Accordingly, it is possible to further shorten the takt time. In addition, in particular, in the case where the second wireless communication standard uses UWB, it is possible to decrease a possibility of eavesdropping and ensure its security because UWB is not suitable for long-distance communication.

Here, the control of the writing process and the control of the reading process may mean to transfer the received write request and read request to the first control section 113 and cause the first control section 113 to read/write information from/into the first storage section 114. Alternatively, the control of the writing process and the control of the reading process may mean that the second control section 123 directly accesses the first storage section 114 and reads/writes information from/into the first storage section 114.

(3) Control Over Transition to Reception Mode

In the case where a predetermined condition is satisfied, the second communication unit 120 transitions to a reception mode of waiting for reception of a signal. On the other hand, in the case where the predetermined condition is not satisfied, the second communication unit 120 does not wait for reception of a signal. Because the second communication unit 120 does not transition to the reception mode until the predetermined condition is satisfied, it is possible to shorten a reception waiting period and reduce electric power to be consumed to wait for reception. In particular, UWB consumes a large amount of electric power during the reception waiting period. Therefore, such configurations achieve great electric power saving effects.

Note that, the reception waiting period means a state capable of acquiring and processing a desired signal. The state capable of acquiring and processing a desired signal may mean to start importing a signal received via an antenna into a processing device. In addition, the state capable of acquiring and processing a desired signal may mean to start performing various kinds of subsequent processes on the signal imported into the processing device. Note that, in the case where the system is configured in such a manner that the processing device imports a signal when reception of a desired signal via an antenna is detected, the state capable of acquiring and processing a signal may mean to receive the desired signal via the antenna.

Examples of the various kinds of subsequent processes include a process of determining whether or not a signal received via the antenna is the desired signal, a process of checking information included in the signal, and the like.

The state of waiting for reception is also referred to as a reception waiting state. In addition, a period in which the device in the reception waiting state is also referred to as the reception waiting period.

Examples of the predetermined condition include a condition that a reception mode transition request is received. For example, the reception mode transition request is received by the first communication unit 110 and is relayed to the second communication unit 120. The reception mode transition request may be a wake-up signal for instructing to activate a device or may be a signal including another predetermined sequence. Other examples of the predetermined condition may include a condition that predetermined operation is performed on a switch provided on the communication device 100. However, the predetermined operation is preferably operation that is performed only on the basis of intention of the user such as operation of long-pressing a plurality of switches for several tens of seconds.

(4) Flow of Process

Figure 2:
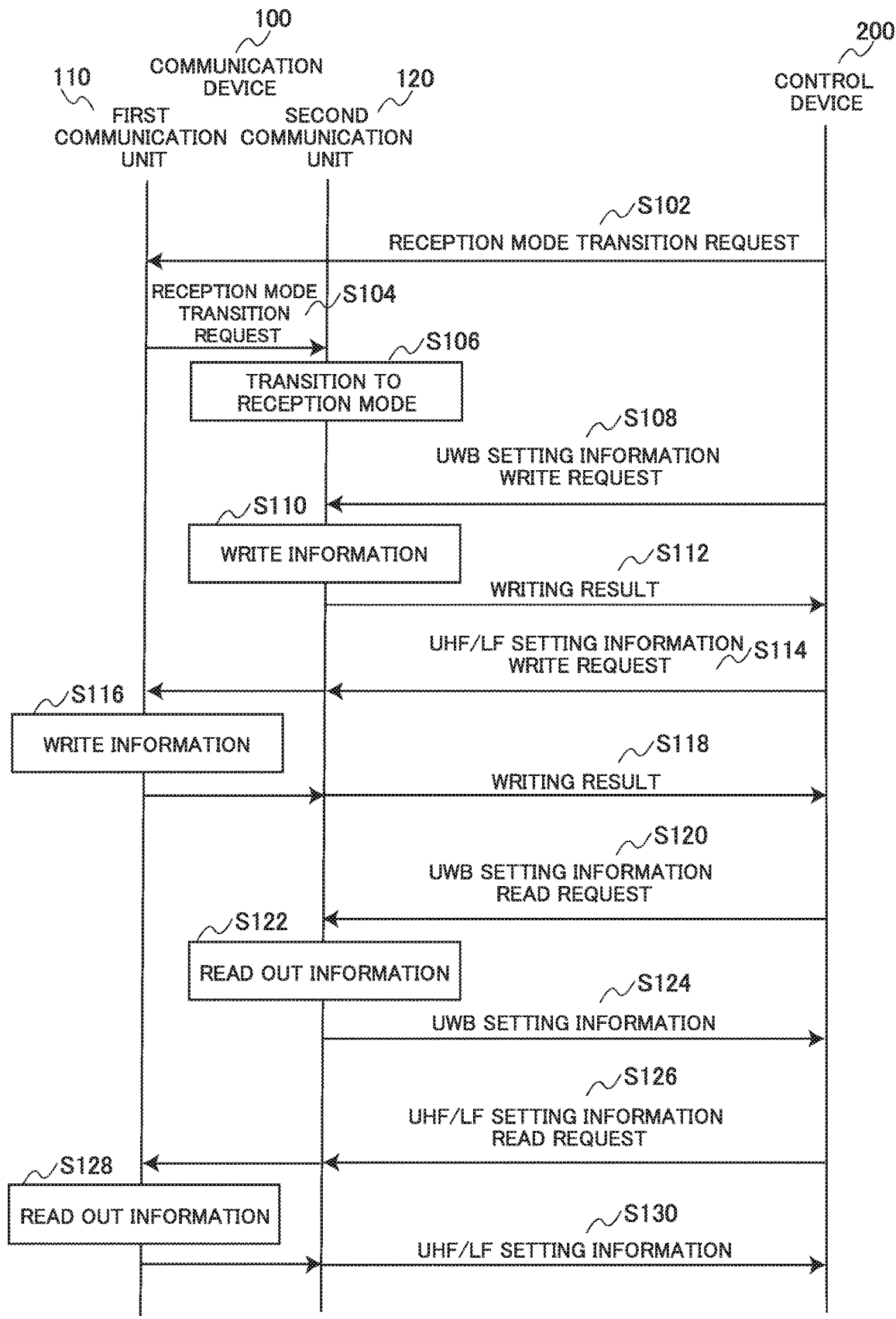
FIG. 2 is a diagram for describing an example of a flow of a storage control process performed in the system according to the present embodiment.

FIG. 2 is a diagram for describing an example of a flow of a storage control process performed in the system 1 according to the present embodiment. The communication device 100 and the control device 200 are involved in this sequence. Note that, arrows connecting a line of the first communication unit 100 and a line of the control device 200 represent transmission/reception of signals between the first wireless communication section 111 and the first wireless communication section 201, that is, transmission/reception of signals using LF/UHF. In addition, arrows connecting a line of the second communication unit 120 and the line of the control device 200 represent transmission/reception of signals between the second wireless communication section 121 and the second wireless communication section 202, that is, transmission/reception of signals using UWB. In addition, arrows connecting the line of the first communication unit 100 and the line of the second communication unit 120 represent transmission/reception of signals between the first wireless communication section 110 and the second communication unit 120.

As illustrated in FIG. 2, first, the first wireless communication section 201 of the control device 200 transmits a reception mode transition request (Step S102). The reception mode transition request may be transmitted as an LF/UHF band signal.

When the reception mode transition request is received by the first wireless communication section 111, the first control section 113 of the first communication unit 110 transfers the reception mode transition request to the second communication unit 120 (Step S104).

Next, the second communication unit 120 transitions to the reception mode (Step S106).

Next, the second wireless communication section 202 of the control device 200 transmits a UWB setting information write request (Step S108). The UWB setting information write request may be transmitted as a UWB signal.

When the UWB setting information write request is received by the second wireless communication section 121, the second control section 123 of the second communication unit 120 writes UWB setting information into the second storage section 124 (Step S110).

Next, the second wireless communication section 121 of the second communication unit 120 transmits a result of writing the UWB setting information (Step S112). The result of writing the UWB setting information may be transmitted as a UWB signal. The second wireless communication section 202 of the control device 200 receives the transmitted result of writing the UWB setting information.

Next, the second wireless communication section 202 of the control device 200 transmits an LF/UHF setting information write request (Step S114). The LF/UHF setting information write request may be transmitted as a UWB signal. When the LF/UHF setting information write request is received by the second wireless communication section 121, the second control section 123 of the second communication unit 120 transfers the received write request to the first communication unit 110.

When the LF/UHF setting information write request is received, the first control section 113 of the first communication unit 110 writes LF/UHF setting information into the first storage section 114 (Step S116).

Next, the first control section 113 of the first communication unit 110 transmits a result of writing the LF/UHF setting information to the second communication unit 120. When the result of writing the LF/UHF setting information is received by the second control section 123 of the second communication unit, the second wireless communication section 121 transmits the result of writing the LF/UHF setting information (Step S118). The result of writing the LF/UHF setting information may be transmitted as a UWB signal. The second wireless communication section 202 of the control device 200 receives the transmitted result of writing the LF/UHF setting information.

Next, the second wireless communication section 202 of the control device 200 transmits a UWB setting information read request (Step S120). The UWB setting information read request may be transmitted as a UWB signal.

When the UWB setting information read request is received by the second wireless communication section 122, the second control section 123 of the second communication unit 120 reads out the UWB setting information from the second storage section 124 (Step S122).

Next, the second wireless communication section 121 of the second communication unit 120 transmits the read-out UWB setting information (Step S124). The UWB setting information may be transmitted as a UWB signal. The second wireless communication section 202 of the control device 200 receives the transmitted UWB setting information.

Next, the second wireless communication section 202 of the control device 200 transmits an LF/UHF setting information read request (Step S126). The LF/UHF setting information read request may be transmitted as a UWB signal. When the LF/UHF setting information read request is received by the second wireless communication section 121, the second control section 123 of the second communication unit 120 transfers the LF/UHF setting information read request to the first communication unit 110.

When the LF/UHF setting information read request is received, the first control section 113 of the first communication unit 110 reads out the LF/UHF setting information from the first storage section 114 (Step S128).

Next, the first control section 113 of the first communication unit 110 transmits the read-out LF/UHF setting information to the second communication unit 120. When the LF/UHF setting information is received by the second control section 123 of the second communication unit, the second wireless communication section 121 transmits the LF/UHF setting information (Step S130). The LF/UHF setting information may be transmitted as a UWB signal. The second wireless communication section 202 of the control device 200 receives the transmitted LF/UHF setting information.

4. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

The embodiment has been described above on the assumption that the control device 100 includes the two control section, which are the first control section 113 and the second control section 123 as the control sections. However, the present invention is not limited thereto. The communication device 100 may include a single control section and may collectively control storage in the first storage section 114 and the second storage section 124. In this case, it is possible for the single control section to integrally control reading/writing of setting information that is information regarding settings necessary to perform wireless communication in conformity with the two wireless communication standards. On the other hand, when using the configuration in which control sections handle reading/writing of setting information in conformity with respective wireless communication standards like the above-described embodiment, such division of work makes it possible to reduce load on each of the control sections and perform complex control in such a manner that one of the control sections controls the other of the control sections. In addition, when using the configuration according to the above embodiment, it is also possible to commission a normal control section to handle reading/writing of setting information that a control section having abnormality should have handled, even in the case where some of a plurality of control sections have abnormality.

The embodiment has been described above on the assumption that the control device 100 includes the wired communication sections (first wired communication section 112 and second wired communication section 122). However, the present invention is not limited thereto. The communication device 100 does not have to include the wired communication sections, and the communication device 100 may read/write information only via the wireless communication sections (first wireless communication section 111 and second wireless communication section 121). Such a configuration makes it possible to simplify the configuration of the communication device 100 and further shorten the takt time by omitting the processes of reading/writing information through wired communication. On the other hand, as described in the above embodiment, the wireless communication and the wired communication are separately performed according to the configuration in which the communication device 100 includes the wired communication sections. Typically, this makes it possible to receive benefits of the wired communication such as a lower possibility of eavesdropping and a lower error rate in comparison with the wireless communication.

The embodiment has been described above on the assumption that the control device 100 includes the two communication units, which are the first communication unit 110 and the second communication unit 120. However, the present invention is not limited thereto. The communication device 100 may include a single communication unit, or three or more communication units.

Although the example in which the present invention is applied to the smart entry system has been described in the above embodiment, the present invention is not limited thereto. The present invention is applicable to any device including the wireless communication function. For example, the present invention is applicable to any device such as a smartphone, a drone, or a home appliance.

In the above embodiment, the standards using UHF/LF and UWB have been exemplified as the wireless communication standards. However, the present invention is not limited thereto. For example, it is also possible to use Wi-Fi (registered trademark), Bluetooth (registered trademark), Near-Field-Communication (NFC), infrared communication, or the like as the wireless communication standards.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes each program, the program is read into RAM, and executed by a processor such as a CPU. The recording medium may be a magnetic disk, an optical disc, a magneto-optical disc, flash memory, or the like. Alternatively, the above-described computer program may be distributed via a network without using the recording medium, for example.

In addition, the method of controlling storage in the communication device 100 by causing the control device 200 to transmit the write request and the read request to the communication device 100 may be provided as a production method of producing the communication device 100 having predetermined information stored therein.

Further, in the present specification, the processes described using the sequence diagram are not necessarily executed in the order illustrated in the drawing. Some processing steps may be executed in parallel. In addition, additional processing steps may be employed and some processing steps may be omitted.

REFERENCE SIGNS LIST

1 system
100 communication device
110 first communication unit
111 first wireless communication section
112 first wired communication section
113 first control section
114 first storage section
120 second communication unit
121 second wireless communication section
122 second wired communication section
123 second control section
124 second storage section
200 control device
201 first wireless communication section
202 second wireless communication section
203 wired communication section
204 control section

What is claimed is:

1. A communication device comprising:
   a wireless communication interface;
   a memory configured to store information; and
   a processor configured to write the information received by the wireless communication section into the memory,
   wherein the processor writes setting information into the memory, the setting information being information regarding a setting necessary for the wireless communication interface to perform the wireless communication,
   wherein the wireless communication interface includes a first wireless communication interface configured to perform communication in conformity with a first wireless communication standard and a second wireless communication interface configured to perform communication in conformity with a second wireless communication standard, and
   wherein the processor writes, into the memory, information received by the first wireless communication interface and information received by the second wireless communication interface,
   wherein the memory includes a first memory and a second memory,
   wherein the processor includes a first processor configured to write information received by the first wireless communication interface into the first memory, and a second processor configured to write information received by the second wireless communication interface into the second memory, and
   wherein the second wireless communication interface starts wireless communication with another device and after starting the wireless communication with the other device, the second wireless communication interface writes the setting information into the second memory.

2. The communication device according to claim 1, wherein the second wireless communication standard is capable of communication at a higher speed than the first wireless communication standard.

3. The communication device according to claim 2, wherein the second wireless communication standard uses a carrier wave of higher frequency than frequency of a carrier wave used under the first wireless communication standard.

4. The communication device according to claim 1, wherein the second processor controls a process of writing information received by the second wireless communication interface into the first memory.

5. The communication device according to claim 1, further comprising
   a wired communication test pin configured to perform wired communication,
   wherein the processor controls restriction on writing of information received by the wired communication test pin into the memory.

6. The communication device according to claim 1, wherein the processor controls the wireless communication interface to transmit the information stored in the memory.

* * * * *